(12) United States Patent
Brown et al.

(10) Patent No.: US 8,595,697 B2
(45) Date of Patent: Nov. 26, 2013

(54) SERIALIZING A TEMPLATED MARKUP LANGUAGE REPRESENTATION OF TEST ARTIFACTS

(75) Inventors: Michael S. Brown, Research Triangle Park, NC (US); Paul F. McMahan, Research Triangle Park, NC (US); Sachin P. Patel, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 12/496,388

(22) Filed: Jul. 1, 2009

(65) Prior Publication Data

US 2011/0004865 A1   Jan. 6, 2011

(51) Int. Cl.
*G06F 9/44* (2006.01)

(52) U.S. Cl.
USPC ............................ 717/113; 717/124; 717/125

(58) Field of Classification Search
USPC .................................. 717/113–115, 124–129
See application file for complete search history.

(56) References Cited

U.S. PATENT DOCUMENTS

| | | | | |
|---|---|---|---|---|
| 6,304,886 | B1 * | 10/2001 | Bernardo et al. | 715/234 |
| 6,754,885 | B1 * | 6/2004 | Dardinski et al. | 717/113 |
| 6,889,158 | B2 * | 5/2005 | Penov et al. | 702/119 |
| 7,237,231 | B2 * | 6/2007 | Lambert | 717/127 |
| 7,272,822 | B1 * | 9/2007 | Riggins et al. | 717/124 |
| 7,310,798 | B1 * | 12/2007 | Gunara et al. | 717/135 |
| 7,448,021 | B1 * | 11/2008 | Lamkin et al. | 717/115 |
| 7,490,319 | B2 * | 2/2009 | Blackwell et al. | 717/124 |
| 7,506,315 | B1 * | 3/2009 | Kabadiyski et al. | 717/128 |
| 7,669,183 | B2 * | 2/2010 | Bowman et al. | 717/113 |
| 7,681,176 | B2 * | 3/2010 | Wills et al. | 717/109 |
| 7,752,606 | B2 * | 7/2010 | Savage | 717/135 |
| 7,793,258 | B2 * | 9/2010 | Sundararajan et al. | 717/109 |
| 7,877,732 | B2 * | 1/2011 | Day et al. | 717/124 |
| 7,890,931 | B2 * | 2/2011 | Lauzon et al. | 717/125 |
| 7,913,231 | B2 * | 3/2011 | Stienhans et al. | 717/125 |
| 8,001,525 | B2 * | 8/2011 | Agostini et al. | 717/114 |
| 8,191,048 | B2 * | 5/2012 | Parthasarathy et al. | 717/126 |
| 8,296,721 | B2 * | 10/2012 | Sivaram | 717/104 |

OTHER PUBLICATIONS

Sun et al, "Multi-Objective Test Case Prioritization for GUI Applications", ACM SAC, pp. 1074-1079, 2013.*

(Continued)

*Primary Examiner* — Anil Khatri
(74) *Attorney, Agent, or Firm* — Steven M. Greenberg Esq.; Carey, Rodriguez, Greenberg & O'Keefe

(57) ABSTRACT

Embodiments of the present invention address deficiencies of the art in respect to software testing and provide a method, system and computer program product for serializing a templated markup language representation of test artifacts. In an embodiment of the invention, a method for configuring a test plan for serialization can be provided. The method can include selecting a template of a test plan through a graphical user interface of a test plan markup generation module executing in memory by a processor of a host computer. The method also can include extracting a table of contents from the selected template such that the table of contents includes at least one reference to at least one test case. Finally, the method can include transforming at least one portion of the table of contents including a test case into a markup language representation of the template of the test plan, for instance an XML representation.

10 Claims, 1 Drawing Sheet

(56) References Cited

OTHER PUBLICATIONS

Yuan et al, "Using GUI Run-Time State as Feedback to Generate Test Cases", IEEE, pp. 1-10, 2007.*

Memon et al, "Automatically Repairing Event Sequence-Based GUI Test Suites for Regression Testing" ACM Trans. on Software Eng. & Methd. vol. 18, No. 2, article 4, pp. 1-36, 2008.*

Nguyen et al, "Automated Functionality Testing through GUIs", ACM-ASSC, pp. 153-162, 2010.*

Bird, Colin; Sermon, Andrew; "An XML-based approach to automated software testing"; IBM UK Laboratories; Software Engineering Notes; vol. 26; No. 2; p. 64-65; Mar. 2001.

* cited by examiner

SERIALIZING A TEMPLATED MARKUP LANGUAGE REPRESENTATION OF TEST ARTIFACTS

BACKGROUND OF THE INVENTION

1. Field of the Invention

The present invention relates to the field of software testing and more particularly to automated software testing.

2. Description of the Related Art

The art of software development extends far beyond a mere coding of a functional specification for a computer program. Modem software development conforms to a lifecycle that begins with the functional specification leading into the formulation of a suitable architecture for an application implementing the functional specification. The lifecycle continues with the physical coding of the application and includes iterative testing and modification cycles to ensure the integrity of the code. Finally, the execution of the completed code can be analyzed to facilitate the further revision of the code to improve the performance of the code.

Traditional testing of a computer program can include the external monitoring of the integrity of the program and the performance of the program, either subjectively based upon end user impression, or objectively based upon independently acquired metrics. In the latter circumstance, the integrity of the program can include the simulation of user interaction with the user interface of the program to ensure the proper operation of the program logic. Likewise, the performance of the program can include an internal monitoring of the code through software test tooling as is known in the art.

Often, to test an application, testing personnel must establish and configure a testing environment. Within the testing environment, a test protocol can be defined for exercising a computing application. The individual steps and portions of the testing protocol, in turn, can be automated through operating system scripts, batch files and the like. Generally, automated testing includes a class of automated tests in which a driver tool simulates the input and responses of a human operator and sequentially checks the output generated by the computing application. The driver tool commonly employs its own language to describe the tasks it can be required to perform in testing the computing application.

Automated software testing can be managed through the use of two different types of artifacts: test plans and test cases enumerated within test plans. The content of each type of artifact will usually differ significantly across software test organizations. Specifically, there is a large level of customization that must be applied to the content of each artifact. Currently, most test organizations use free-form rich text documents for the content of these artifacts that generally includes different sections enumerated in a table of contents such as a set of test objective, testing requirements, and test cases to name only a few. When in the form of a rich text document, however, it can be very difficult to provide a useful serialization mechanism for serializing the test plan artifact to facilitate storage or the transfer of the artifact over a computer communications network between systems. Further, existing testing systems do not allow a templated form of the rich text document embodying the test plan and corresponding test cases to be externalized separately from the data to which the template is bound.

BRIEF SUMMARY OF THE INVENTION

Embodiments of the present invention address deficiencies of the art in respect to software testing and provide a novel and non-obvious method, system and computer program product for serializing a templated markup language representation of test artifacts. In an embodiment of the invention, a method for configuring a test plan for serialization can be provided. The method can include selecting a template of a test plan through a graphical user interface of a test plan markup generation module executing in memory by a processor of a host computer. The method also can include extracting a table of contents from the selected template such that the table of contents includes at least one reference to at least one test case. Finally, the method can include transforming at least one portion of the table of contents including a test case into a markup language representation of the template of the test plan, for instance an XML representation.

In one aspect of the embodiment, the method further can include retrieving a revision level for the selected template, and inserting the retrieved revision level into the markup language representation. In another aspect of the embodiment, the method further can include loading the markup language representation into a text editor, accepting edits to the markup language representation through the text editor, and persisting the edited markup language representation in fixed storage as a customized markup language representation of the test plan. In even yet another aspect of the embodiment, the method can further include serializing the markup language representation of the template for transmission over a computer communications network.

In another embodiment of the invention, a software testing data processing system can be provided. The system can include a computer with processor and memory and coupled to fixed storage comprising different test plan templates. The system also can include an operating system executing in the memory of the computer by the processor of the computer. A text editor can be hosted by the operating system as can a test plan markup generation module. In this regard, the module can include program code enabled to select a template of a test plan from the fixed storage through a graphical user interface of the test plan markup generation module, to extract a table of contents from the selected template, the table of contents including at least one reference to at least one test case, and to transform at least one portion of the table of contents including a test case into a markup language representation of the template of the test plan for editing in the text editor into a customized markup language representation of the template of the test plan.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for serializing a templated markup language representation of test artifacts. In accordance with an embodiment of the present invention, a template of a test plan can be selected and retrieved from fixed storage. A table of contents for the template including a specification of one or more test case artifacts can be extracted and a markup language representation of the test plan can be generated to include selected portions of the table of contents for loading into a text editor. Notably, a revision level for the selected template of the test plan can be identified and inserted as a markup language statement into the markup language representation. Additional edits to the markup language representation can be applied in the text editor in order to produce a customized test plan. Thereafter, the markup language representation can be persisted to fixed storage for subsequent serialization. In this regard, the serialization can arise in storing the markup language representation or in transmitting the markup language representation over a computer communications network.

Figure 1:
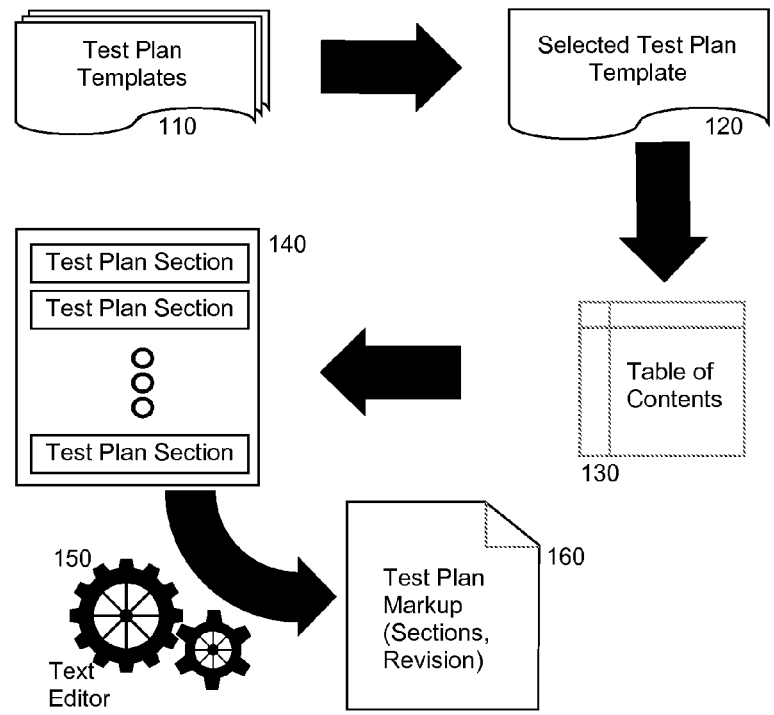
FIG. 1 is a pictorial illustration of a process for serializing a templated markup language representation of test artifacts.

In further illustration, FIG. 1 pictorially shows a process for serializing a templated markup language representation of test artifacts. As shown in FIG. 1, a test plan template 120 can be selected from amongst a set of test plan templates 110. For example, a graphical user interface can be rendered in an application hosted by an operating system of a computer with processor and memory. The graphical user interface can discover by way of a file dialog one or more pre-stored test plan templates in one or more locations in fixed storage either locally or remotely over a computer communications network. Once selected, the selected test plan template 120 can be loaded into memory and a table of contents 130 can be extracted from the selected test plan template 120.

In this regard, the table of contents 130 can include an outline of the content of the test plan template 120, including by way of example, a summary portion of the business objectives of an associated test plan, the test objectives of the associated test plan, a formal review of the test plan, the requirements of the test plan, test schedules for the test plan, a test estimation of the test plan, specified test environments for the test plan, a test team for executing the test plan, quality objectives of the test plan, application security for the test plan, entry criteria for the test plan, and exit criteria for the test plan. The outline of the content of the table of contents 130 also can include a test cases portion specifying resources for test cases for the test plan and also any attachments for use with the use cases.

The table of contents 130 can be transformed into a markup language representation 140 of the selected test plan template 120 including different test plan sections reflective of the content of the table of contents 130. Of note, a revision level indicating a version of the selected test plan template 120 along with an identifier of the selected test plan template 120 can be inserted into the markup language representation 140 of the selected test plan template 120. Subsequently, the markup language representation 140 can be loaded into a text editor 150 for customization by an end user. The customization performed by the end user can result in a markup language representation 160 of a customized test plan inclusive of revision data for the selected test plan template 120 from which the markup language representation 160 had been derived. Consequently, the markup language representation 160 of the customized test plan can be serialized for ease of storage or network transmission.

Figure 2:
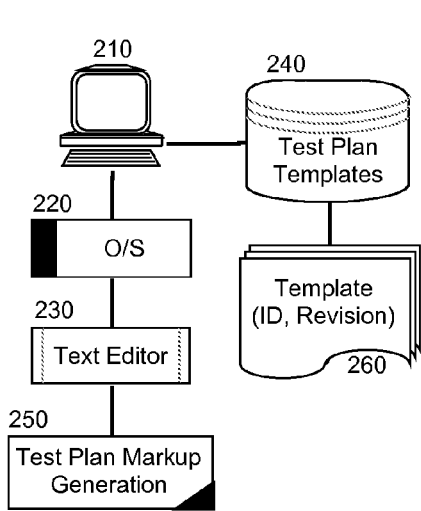
FIG. 2 is a schematic illustration of a software testing data processing system configured for serializing a templated markup language representation of test artifacts; and, FIG. 3 is a flow chart illustrating a process for serializing a templated markup language representation of test artifacts.

The process described in connection with FIG. 1 can be implemented in a software testing data processing system. In this regard, FIG. 2 is a schematic illustration of a software testing data processing system configured for serializing a templated markup language representation of test artifacts. The system can include a host computer 210 with processor and memory supporting the execution of an operating system 220 and coupled to fixed storage 240. The operating system 220 can host the execution of a text editor 230 coupled to a test plan markup generation module 250. The test plan markup generation module 250 can include program code enabled upon the execution of the program code by the processor while loaded into memory of the host computer 210 to transform a template of test plan into a markup language representation thereof and to permit the customization of the markup language representation through the text editor 230 in order to produce a customized test plan able to be serialized for ease of persistence or network transmission.

More particularly, the program code of the test plan markup generation module 250 can be enabled to select a template of a test plan 260 from fixed storage 240. The table of contents of the selected template of the test plan 260 can be transformed into a markup language representation, for example XML. An identifier for the selected template of the test plan 260 along with a revision level of the selected template of the test plan 260 can be inserted into the markup language representation and the markup language representation can be loaded into the text editor 230 for editing and customization. Consequently, the resulting markup language representation can be easily serialized for persistence or transmission over a computer communications network.

Figure 3:
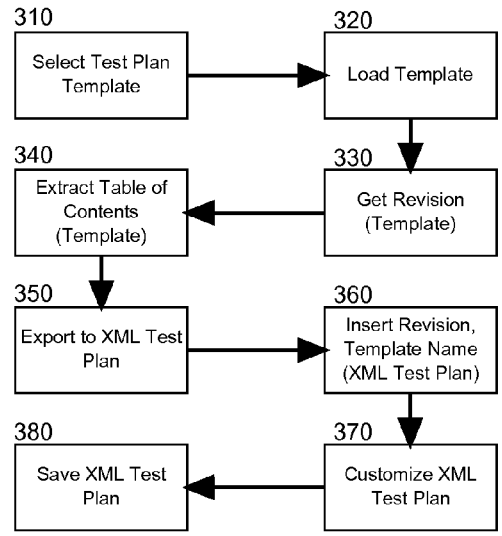

In even yet further illustration of the operation of the test plan markup generation module 250, FIG. 3 is a flow chart illustrating a process for serializing a templated markup language representation of test artifacts. Beginning in block 310, a template of a test plan can be selected and loaded into memory in block 320. In block 330, the revision level (such as a current version or date of last version) can be retrieved for the selected template of the test plan and in block 340 the table of contents of the selected template of the test plan can be extracted from the selected template of the test plan. In block 350, one or more selected portions of the table of contents can be transformed into a markup language representation of the selected template of the test plan, for example by referencing a translation table of content of the selected template to markup language statement. In block 360, the retrieved revision level can be inserted into the markup language representation along with an identifier of the selected template of the test plan. In block 370, the resulting markup language representation of the selected template of the test plan can be rendered editable in a text editor for customization. Thereafter, in block 380 the resulting markup language representation as customized can be persisted for ease of serialization.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for configuring a test plan for serialization, the method comprising:
   selecting a template of the test plan through a graphical user interface of a test plan markup generation module executing in memory by a processor of a host computer;
   extracting a table of contents from the selected template, the table of contents including at least one reference to at least one test case;
   transforming at least one portion of the table of contents including the at least one test case into a markup language representation of the selected template of the test plan retrieving a revision level for the selected template; and,
   inserting the retrieved revision level into the markup language representation.

2. The method of claim 1, further comprising:
   loading the markup language representation into a text editor;
   accepting edits to the markup language representation through the text editor; and,
   persisting the edited markup language representation in fixed storage as a customized markup language representation of the test plan.

3. The method of claim 1, further comprising serializing the markup language representation of the selected template for transmission over a computer communications network.

4. The method of claim 1, wherein the markup language representation is an extensible markup language (XML) representation.

5. A software testing data processing system comprising:
   a computer with processor and memory and coupled to fixed storage comprising a plurality of test plan templates;
   an operating system executing in the memory of the computer by the processor of the computer;
   a text editor hosted by the operating system; and,
   a test plan markup generation module hosted by the operating system, the test plan markup generation module comprising program code enabled to select a template of a test plan from the fixed storage through a graphical user interface of the test plan markup generation module, to extract a table of contents from the selected template, the table of contents including at least one reference to at least one test case, to transform at least one portion of the table of contents including the at least one test case into a markup language representation of the selected template of the test plan for editing in the text editor into a customized markup language representation of the selected template of the test plan, to retrieve a revision level for the selected template, and to insert the retrieved revision level into the markup language representation.

6. The system of claim 5, wherein the markup language representation is an extensible markup language (XML) representation of the selected template of the test plan.

7. A computer program product comprising a computer usable storage medium storing computer usable program code for configuring a test plan for serialization, the computer program product comprising:
   computer usable program code for selecting a template of the test plan through a graphical user interface of a test plan markup generation module executing in memory by a processor of a host computer;
   computer usable program code for extracting a table of contents from the selected template, the table of contents including at least one reference to at least one test case;
   computer usable program code for transforming at least one portion of the table of contents including the at least one test case into a markup language representation of the selected template of the test plan computer usable program code for retrieving a revision level for the selected template; and,
   computer usable program code for inserting the retrieved revision level into the markup language representation.

8. The computer program product of claim 7, further comprising:
   computer usable program code for loading the markup language representation into a text editor;
   computer usable program code for accepting edits to the markup language representation through the text editor; and,
   computer usable program code for persisting the edited markup language representation in fixed storage as a customized markup language representation of the test plan.

9. The computer program product of claim 7, further comprising computer usable program code for serializing the markup language representation of the selected template for transmission over a computer communications network.

10. The computer program product of claim 7, wherein the markup language representation is an extensible markup language (XML) representation.

* * * * *